United States Patent
Imura et al.

[19]

[11] Patent Number: 5,909,653
[45] Date of Patent: Jun. 1, 1999

[54] PORTABLE RADIO DEVICE

[75] Inventors: Minoru Imura, Saitama; Naoki Hirasawa, Tokyo, both of Japan

[73] Assignee: NEC Corporation, Japan

[21] Appl. No.: 08/560,207

[22] Filed: Nov. 21, 1995

[30] Foreign Application Priority Data

Nov. 24, 1994 [JP] Japan .................................. 6-289521

[51] Int. Cl.⁶ .................................................. H04B 1/38
[52] U.S. Cl. ............................ 455/575; 455/90; 455/97; 455/129; 343/702; 343/882; 379/433; 16/334; 16/344
[58] Field of Search ................................ 455/89, 90, 97, 455/129, 269, 347, 348, 351, 575, 121, 128, 95; 343/702, 882, 900, 901, 902, 903; 16/334, 344; 379/428, 433

[56] References Cited

U.S. PATENT DOCUMENTS

| | | | |
|---|---|---|---|
| 4,313,119 | 1/1982 | Garay et al. | 343/702 |
| 5,166,695 | 11/1992 | Chan et al. | 343/702 |
| 5,218,370 | 6/1993 | Blaese | 343/702 |
| 5,404,390 | 4/1995 | Tamura | 455/97 |
| 5,422,651 | 6/1995 | Chang | 343/702 |
| 5,448,251 | 9/1995 | Gerszberg et al. | 343/702 |
| 5,590,416 | 12/1996 | Rydbeck | 455/90 |

FOREIGN PATENT DOCUMENTS

| | | | |
|---|---|---|---|
| 59-84935 | 6/1984 | Japan . | |
| 63-23810 | 2/1988 | Japan . | |
| 3-175826 | 7/1991 | Japan . | |
| 4-335702 | 11/1992 | Japan . | |
| 4368023 | 12/1992 | Japan | 455/89 |

*Primary Examiner*—Thanh Cong Le
*Assistant Examiner*—Doris To
*Attorney, Agent, or Firm*—Ostrolenk, Faber, Gerb & Soffen, LLP

[57] ABSTRACT

In a portable radio device having a speaker, key buttons, and microphone arranged on the front surface of the case, an antenna support mechanism supports an extended rod-shaped antenna on the top surface of the case. The antenna support mechanism allows rotation of the antenna, which is extended parallel to the front surface of the case, away from the front surface, and holds the antenna in a locked state with respect to the case when the angle of rotation reaches a prescribed angle with respect to the front surface of the case. Accordingly, the antenna can be distanced from the user's face during use and degradation of antenna performance can be prevented.

4 Claims, 3 Drawing Sheets

PORTABLE RADIO DEVICE

BACKGROUND OF THE INVENTION

1. Field of the Invention

The present invention relates to a portable radio device such as a portable telephone for a mobile communication system, and particularly to a portable radio device in which degradation of antenna functions during communication can be reduced.

2. Description of the Related Art

The development of mobile communication systems in recent years has underscored the importance of improving the performance of this type of radio device, one approach focusing on the improvement of antenna gain, antenna pattern, and other factors of antenna performance, and another focusing on various contrivances for storing an antenna for easier portability. For example, Japanese Patent Laid-open No. 175826/91 discloses a portable telephone constructed with a recess in the rear surface of the telephone body 1 for accommodating an antenna unit 21 which may be raised for use by rotating the antenna unit 180° about a hinge member 31 and pulling an extendible whip antenna vertically up from the antenna unit. The antenna can accordingly be positioned considerably higher than the telephone body 1 during use. In Utility Model Laid-open Number 23810/88, the base of a rod antenna is attached to a coupling 4 on the main body of the portable telephone by way of a freely rotatable coupling member 5, the antenna being raised in a vertical direction for use and rotated down when not in use for easy portability. Similarly, Utility Model Laid-open No. 84935/84 discloses a construction in which a rod antenna 8 is attached in a freely rotatable manner to one side of the case 1 of a portable radio device and the case is further provided with a case lid that can be freely opened and closed with respect to the case body and that has a groove 11 on one side that can accommodate the rod antenna, the antenna being raised vertically for use and folded into the groove when not in use.

During use, the rod-shaped antenna such as the rod antenna or whip antenna employed in the above-described portable radio devices extends parallel to the console surface (front surface) of the case of the radio device. As a result, as radio devices become increasingly smaller, the user inevitably comes into closer proximity to the antenna, which is on the top of the case and extends parallel to the front surface of the case. Such a radio device consequently suffers from the drawback of seriously degraded antenna performance which prevents stable communication with another station.

SUMMARY OF THE INVENTION

The object of the present invention is to provide a portable radio device which solves the above-described drawback through a design that allows distancing the antenna from the face of the radio device user during use.

To achieve this object, the present invention comprises an antenna that extends from the upper surface of the case; a speaker, console key buttons, and microphone provided on the front surface of the case; a transmitter-receiver accommodated within the case; and an antenna support mechanism which allows an antenna extended parallel to the front surface of the case to be rotated away from the front surface, and which holds the antenna in a fixed state with respect to the case when the angle of rotation reaches a prescribed angle with respect to the front surface of the case.

According to a preferred embodiment of the present invention, the antenna support mechanism is made up of a pin that supports the antenna in a freely rotatable manner with respect to the case; a movable gear formed fixed to the bottom end portion of the antenna; and a support gear that is accommodated within a depression formed in the upper surface of the case, supported by the bottom of the depression by way of a spring, and meshing with the movable gear through the compressive force of the spring.

Further, the pin in the antenna support mechanism that supports the antenna forms a connection circuit that electrically connects an antenna element of the antenna to a feed circuit of a transmitter-receiver.

As another embodiment, an antenna-holding structure for accommodating the antenna inside the case may also be provided.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Figure 1:
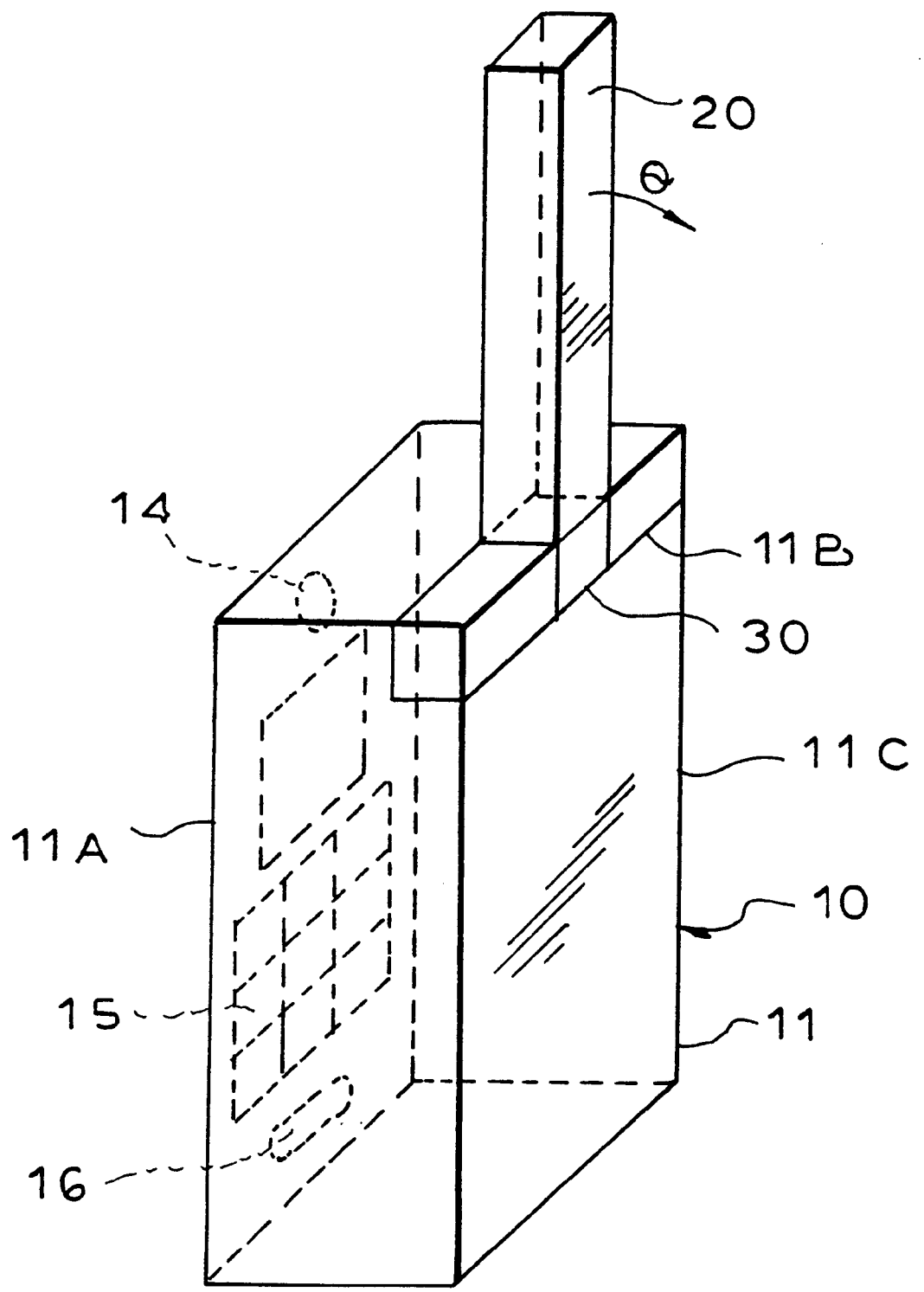
FIG. 1 is schematic perspective view showing one embodiment of the portable radio device of the present invention.

The present invention will next be explained with reference to the accompanying figures. FIG. 1 is a schematic perspective view showing one embodiment of the radio device of the present invention.

The case 11 of a radio device 10 supports on its upper surface 11B an antenna 20 that extends in a direction parallel with the front surface (console surface) 11A of the case 11, accommodates within the case 11 a transmitter-receiver, and has arranged on its front surface 11A a speaker 14, key buttons 15 and a microphone 16.

The antenna 20 of this radio device 10 may be a rod-shaped antenna such as a rod antenna or whip antenna which emits transmission radiowaves of high frequency to another station belonging to a communication partner and which receives the reception radiowaves from the other station. The antenna 20 is connected to the transmitter-receiver (not shown) by way of a feed circuit (not shown), the feed circuit and the transmitter-receiver being accommodated within the case 11. The feed circuit includes a matching circuit of the antenna 20. The transmitter-receiver outputs transmission signals which become transmission radiowaves and inputs reception signals arising from reception radiowaves. A speaker 14, key buttons 15 and a microphone 16 are connected on the terminal side of the transmitter-receiver, and low-frequency signals are transmitted and received between these constituent elements. The speaker 14 sends sound waves to the user, control signals of the radio device 10 are inputted through the key buttons 15, and the user's voice is inputted through the microphone 16.

In the radio device 10 of the present embodiment, the antenna 20 is supported on the upper surface 11B of the case 11 by an antenna support mechanism 30. By means of external force applied by the user against this antenna 20, the antenna support mechanism 30 can be rotated such that the antenna 20 moves away from the front surface 11A, i.e., in the direction of the rear surface 11C, the tip of the antenna 20 describing an arc of θ degrees from the vertical direction. When the rotation of the antenna 20 reaches a prescribed angle sufficiently inclined with respect to the front surface 11A of the case 11, the antenna support mechanism 30 rigidly locks the antenna 20 with respect to the case 11.

Because the front surface 11A of the case 11 is brought close to the user's face during use of the radio device 10, the above-described locked state of the antenna 20 at a prescribed angle sufficiently inclined with respect to the front surface 11A of the case 11 allows the radio device to transmit and receive stably with another station without degradation of antenna performance caused by the user's body.

Figure 2:
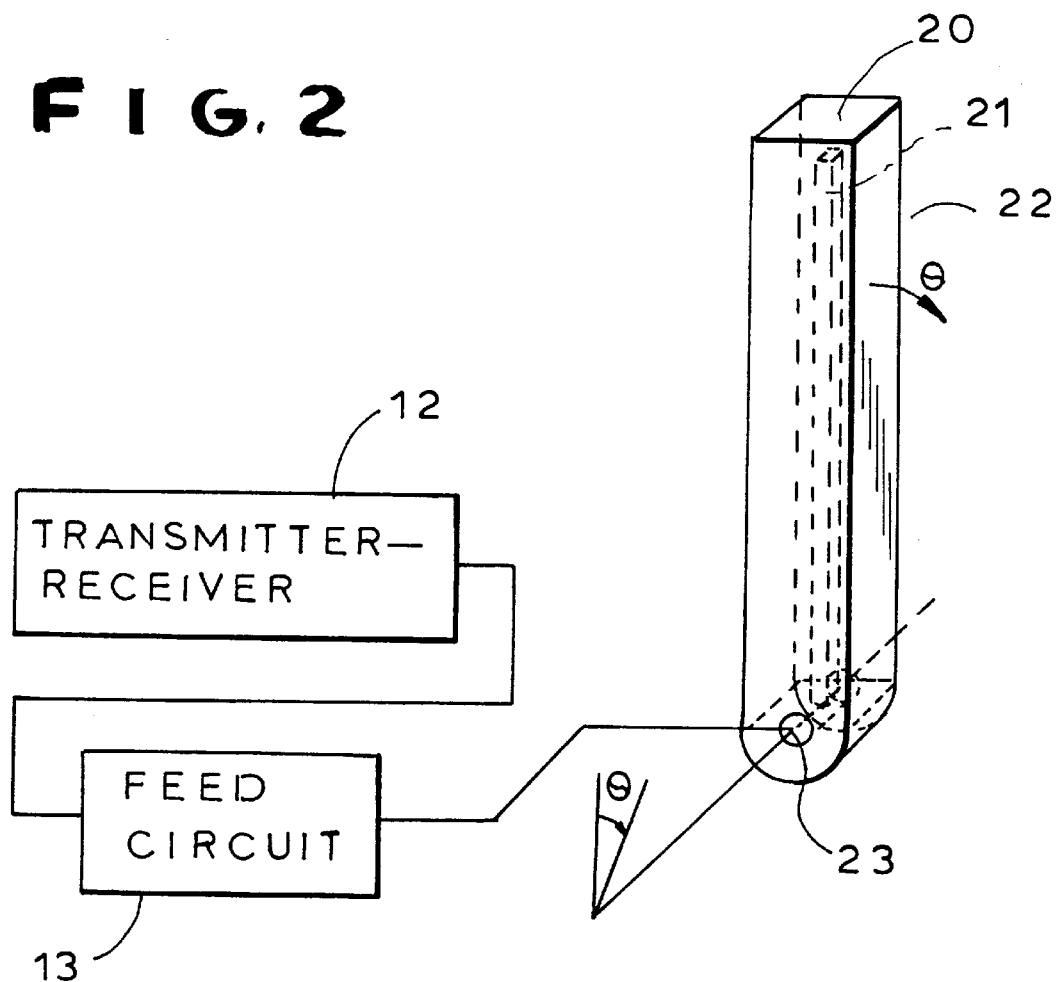
FIG. 2 is a view showing the structure of the antenna 20 used in the present embodiment and the peripheral circuits connected to the antenna 20.

FIG. 2 shows the construction of the antenna used in this embodiment and the peripheral circuits connected to this antenna 20.

Antenna element 21 is composed of a metal rod that determines the major characteristics of the antenna 20. This antenna element 21 may contain for example ferrite to allow a shorter element. An antenna element protector 22 formed from an insulating material having limited high-frequency dielectric loss such as plastic protects the antenna element 21 from damage. A pin 23 is connected to the antenna element 21 and passes through the antenna element protector 22 in a direction parallel to the front surface 11A of the case 11 such that the antenna element protector 22 is freely rotatable. Portions of the pin 23 which protrude from the antenna element protector 22 are rotatably held within the case 11. The pin 23 constitutes both a connection circuit of the feed circuit 13 (the same feed circuit described in the explanation of FIG. 1) and a portion of the antenna support mechanism 30. In other words, the antenna 20 rotates in the e direction with the pin 23 as a pivot. The feed circuit 13 is further connected to the transmitter-receiver 12.

Figure 3:
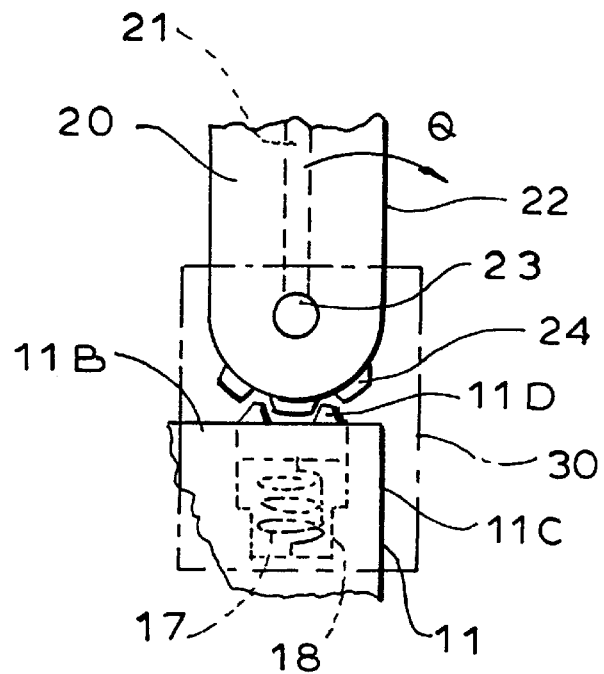
FIG. 3 is a side view of the antenna support mechanism 30 employed in the present embodiment.

FIG. 3 is a side view of the antenna support mechanism 30 employed in this embodiment.

The antenna support mechanism 30 is provided with the pin 23, a movable gear 24 formed fixed to the bottom end of the antenna element protector 22, and a support gear 11D accommodated within a depression 18 formed in the case 11 with two teeth protruding from the upper surface 11B of the case 11. This support gear 11D is supported within the depression 18 by the bottom of the depression by way of a spring 17, and is pressed against and meshes with the movable gear 24 by the compressive force of this spring 17. When the movable gear 24 rotates, the support gear 11D is pressed down into the depression 18 against the resilience of the spring 17, allowing the meshing of the two gears to slip. The movable gear 24 is constructed such that, taking the pin 23 as an axis, the distance between the teeth forms the above-described prescribed angle. Here, an external force is applied in the direction of angle θ against the antenna 20, which has an axis of rotation parallel to the front surface of the case 11. The movable gear 24 therefore moves, and when the angle of the antenna 20 with respect to the front surface 11A of the case 11 reaches the above-described prescribed angle, the teeth of the fixed gear 11D and the movable gear 24 intermesh and lock after having slipped the interval of one tooth. In other words, the antenna 20 is held at a position such that it forms the above-described prescribed angle with respect to the front surface 11A of the case 11.

Figure 4:
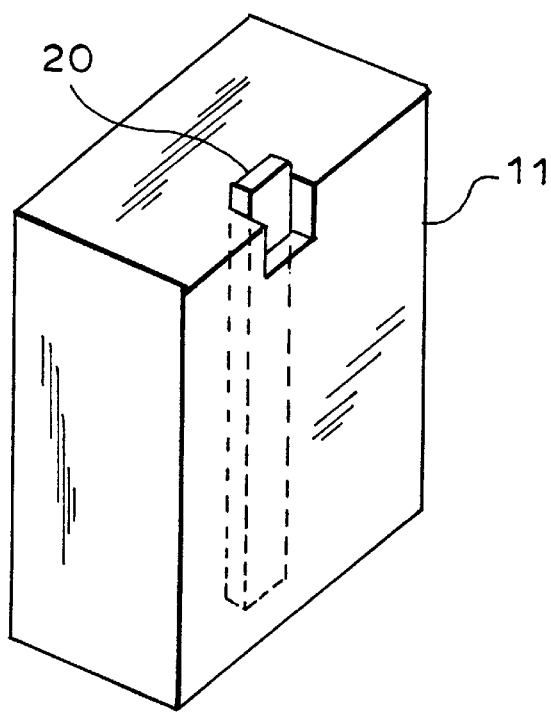
FIG. 4 is a perspective view of another embodiment showing the antenna 20 stored inside the case 11.
Figure 5:
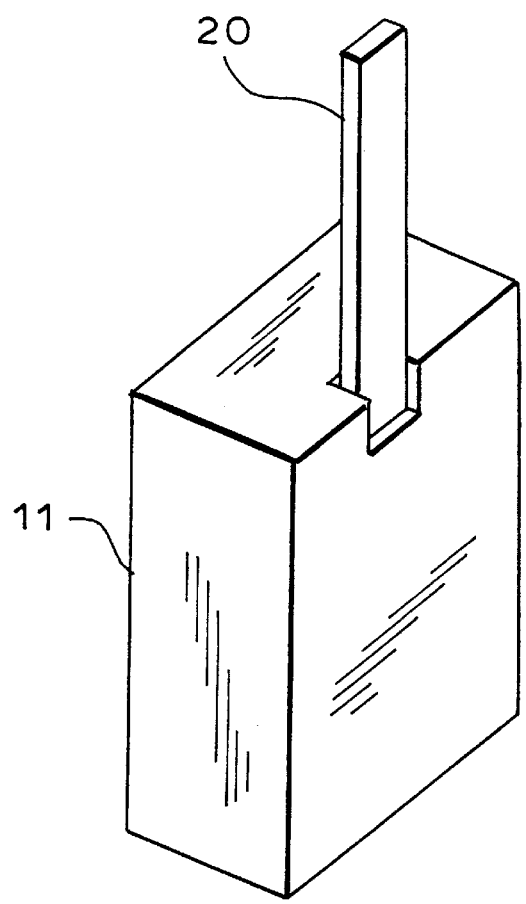
FIG. 5 is a perspective view of the embodiment of FIG. 4 showing the antenna 20 extended from the case.
Figure 6:
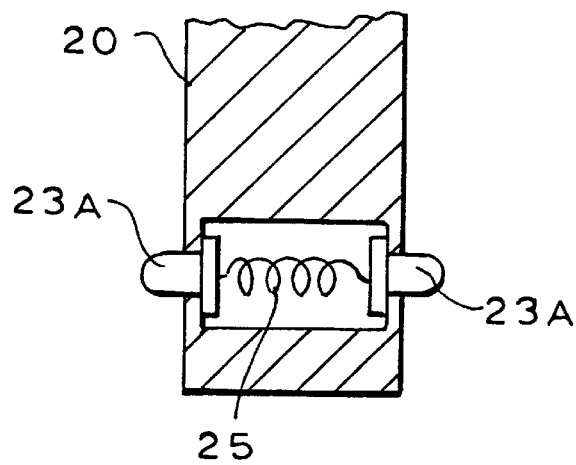
FIG. 6 is partial sectional view of the antenna 20 showing the construction of the pin for antenna support of FIGS. 4 and 5.

As the second embodiment, the antenna 20 and antenna support mechanism 30 are accommodated together inside the case 11 as shown in FIG. 4 or pulled from within the case as shown in FIG. 5. As shown in FIG. 6, the pin 23 which secures the antenna 20 with respect to the case 11 comprises left and right movable portions 23A which are resiliently joined by a spring 25 and which fit into corresponding depressions (not shown) in the case and contact terminals on the side of feed circuit 13. Because the pin 23 is also connected to the antenna element 21 inside the antenna 20, the antenna 20 is in electrical contact with the feed circuit when in the extended position shown in FIG. 5, but out of electrical contact when the antenna is in the stored position shown in FIG. 4.

The present invention as described hereinabove is provided with an antenna support mechanism that both allows an antenna extended from the upper surface of the case of a radio device to be rotated away from the front surface of the case, and holds the antenna in a fixed state with respect to the case when the angle of rotation with respect to the front surface reaches a prescribed angle, and consequently, has the effect of significantly limiting degradation of antenna performance caused by proximity to the face of the user of the radio device.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A portable radio device comprising:
   a case for housing the portable radio device;
   an antenna that extends from the upper surface of the case;
   a speaker, console key buttons, and microphone provided on the front surface of the case;
   a transmitter-receiver accommodated within the case; and
   an antenna support mechanism that allows said antenna to be extended parallel to the front surface of said case, to be rotated away from said front surface, and that holds said antenna in a fixed state with respect to said case when the angle of rotation reaches a prescribed angle with respect to said front surface of said case, the antenna support mechanism including:
   a pin that supports said antenna in a freely rotatable manner with respect to said case,
   a movable gear formed fixed to a bottom end portion of said antenna, and
   a support gear accommodated within a depression formed in the upper surface of said case, supported by the bottom of said depression by way of a spring, and meshing with said movable gear through the compressive force of said spring.

2. A portable radio device according to claim 1 wherein said pin forms a connection circuit that electrically connects an antenna element of said antenna to a feed circuit of said transmitter-receiver.

3. A portable radio device according to claim 1 wherein an antenna holding structure is provided for accommodating said antenna inside said case.

4. A portable radio device comprising:
   a case for housing the portable radio device;

an antenna extending from a surface of the case; and an antenna support mechanism rotatably supporting the antenna, the antenna support mechanism including a movable gear fixed at a bottom end of the antenna, a support gear supported in a depression in the case and engageable with the movable gear, and a biasing mechanism biasing the support gear to the movable gear, wherein the moveable gear and the support gear have teeth which mesh with each other, and a distance between the teeth determine an angle at which the antenna can be displaced relative to the surface of the case.

* * * * *